Nov. 3, 1942.  H. STAHL  2,301,088
FEED ROLLER
Filed Oct. 16, 1941   2 Sheets-Sheet 1

Inventor
Herbert Stahl,

Nov. 3, 1942.  H. STAHL  2,301,088
FEED ROLLER
Filed Oct. 16, 1941  2 Sheets-Sheet 2

Inventor
Herbert Stahl,
By McMorrow & Berman
Attorneys

Patented Nov. 3, 1942

2,301,088

UNITED STATES PATENT OFFICE 2,301,088

FEED ROLLER

Herbert Stahl, Newton, Wis.

Application October 16, 1941, Serial No. 415,314

1 Claim. (Cl. 198—167)

This invention relates to a feed roller especially adapted for cutters or choppers of hay, straw and like material, and has for the primary object the provision of a device of this character which will efficiently cooperate with the ordinary endless feeding mechanism of a cutter or chopper in directing the material to the cutting or chopping mechanism thereof so as to prevent overloading or underloading of said mechanism with the material and consequently assure a substantially uniform supply of material to said mechanism not attainable through the use of the endless feed mechanism alone and is of such a construction to retard or check the wrapping of the material thereabout that would tend to interfere with the proper feeding operation.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1:
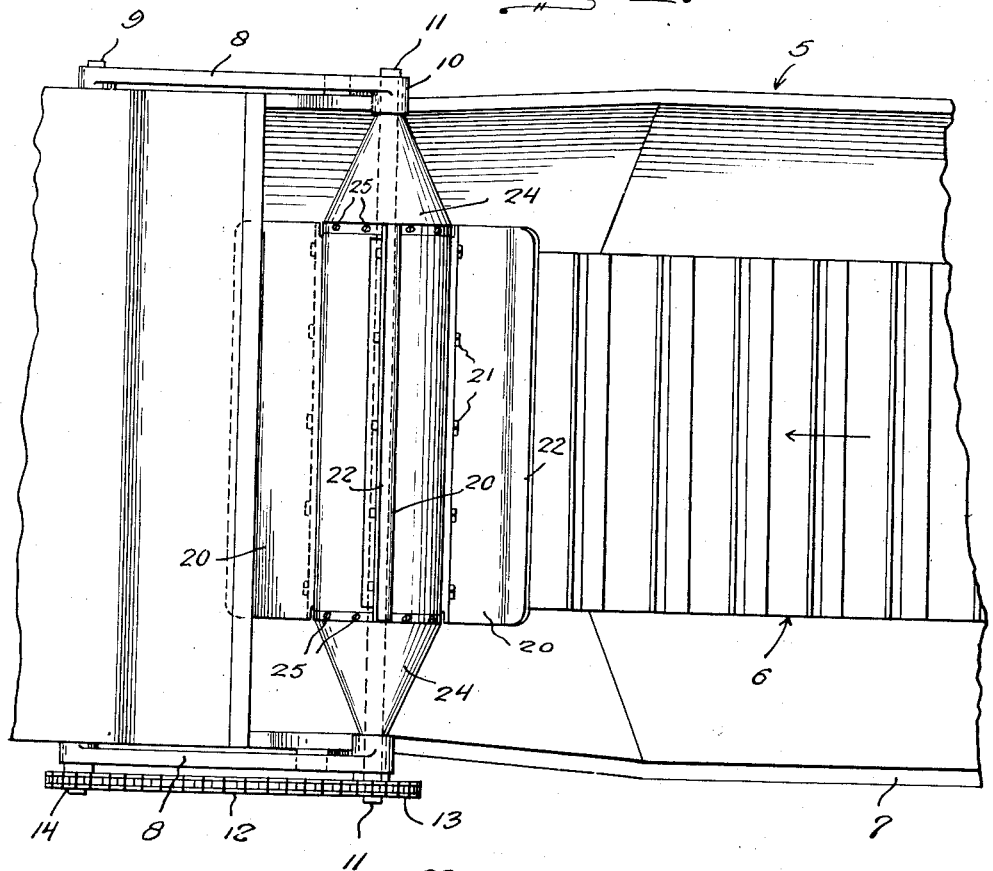
Figure 1 is a fragmentary top plan view illustrating a portion of a cutter or chopper of hay, straw or similar material equipped with a feed roller constructed in accordance with the present invention.
Figure 4:
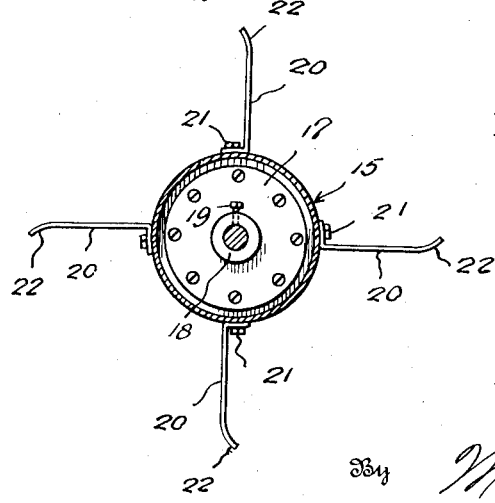
Figure 4 is a transverse sectional view taken on the line 4—4 of Figure 3.

Referring in detail to the drawings, the numeral 5 indicates a fragmentary portion of a conventional cutter or chopper designed especially for cutting or chopping hay, straw or similar material and of the character employing an endless feed mechanism 6 operating in a suitable trough construction for directing the material to the cutting or chopping mechanism (not shown). It is well known in this art that the feeding mechanism 6 will not alone supply a uniform amount of material to the cutting or chopping mechanism owing to the tendency of the material to back up in the trough 7 as it reaches or nears the cutting or chopping mechanism and to obviate the backing up of the material and to assure of a uniform supply of said material to the cutting or chopping mechanism the present invention is adapted to the chopper or cutter by the employment of a pair of supporting arms 8 journaled on a shaft 9 forming a part of the cutting or chopping mechanism.

The arms 8 are arranged on opposite sides of the cutter or chopper and are free to swing upwardly and downwardly and are provided at the free ends thereof with bearings or journals 10 to rotatably support a feed roller shaft 11 transversely of the trough 7 adjacent the chopping or cutting mechanism.

The shaft 11 is driven by the shaft 9 through the employment of an endless sprocket chain 12 trained over sprocket gears 13 and 14. The sprocket gear 13 is secured to one end of the shaft 11 while the sprocket gear 14 is secured to one end of the shaft 9. The shaft 11 supports and rotates a feed roller 15 which is adapted to coact with the endless feed mechanism 6 in uniformly supplying the material to the chopping or cutting mechanism.

The roller 15 consists of a solid cylindrical body 16 provided with a bore arranged axially thereof through which extends the shaft 11. End plates 17 are suitably secured to the ends of the body 16 and are provided with collars 18 surrounding the shaft 11. Set screws 19 are carried by the collars 18 and are turned into engagement with the shaft 11 for locking the body 16 thereto.

Figure 2:
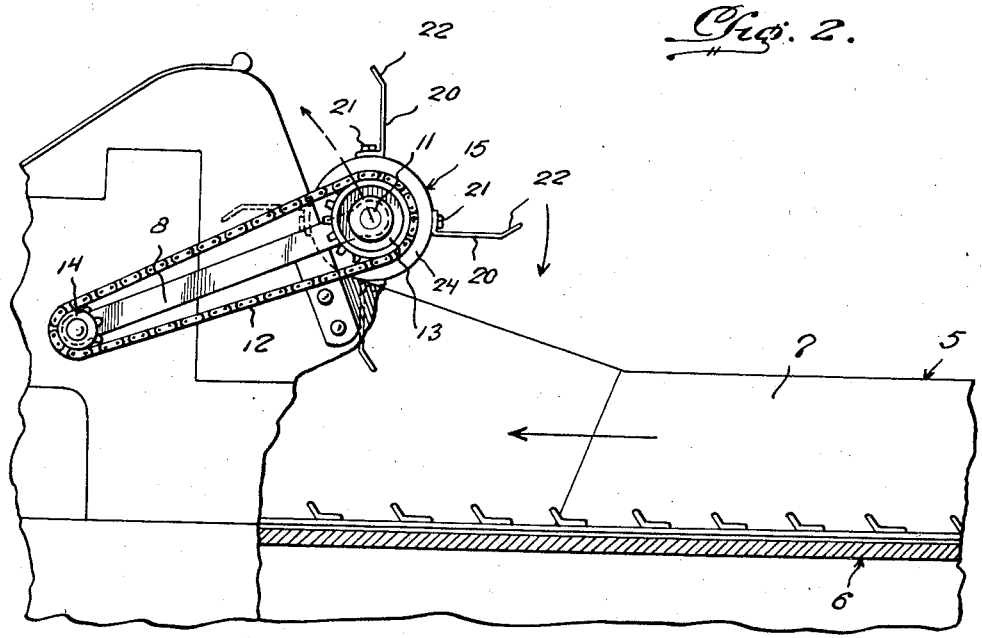
Figure 2 is a fragmentary side elevation, partly in section, illustrating the cutter or chopper equipped with a feed roller in accordance with the invention.
Figure 3:
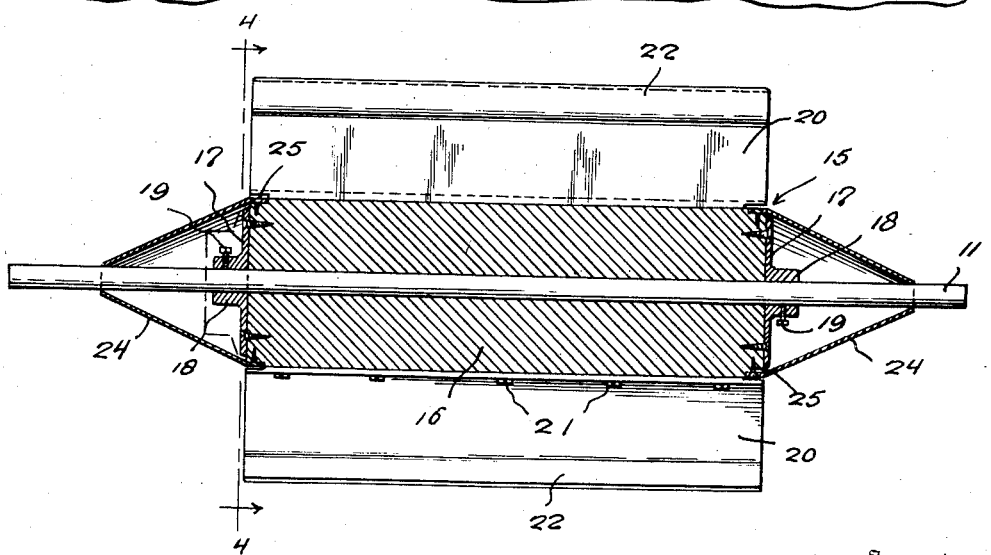
Figure 3 is a vertical sectional view illustrating the feed roller.

The length of the body 16 is substantially equal to the width of the endless feed mechanism 6 and has secured to its periphery and extending longitudinally thereof a plurality of radially extending blades 20, the inner ends of which are right angularly disposed to engage with the periphery of the body and are secured thereto by lag bolts or similar fasteners 21. The blades adjacent the free ends or edges thereof are curved slightly, as shown at 22, the curvature being in an opposite direction to the direction of rotation of the feed roller. The direction of rotation of the feed roller is as indicated by the arrow in Figure 2. The purpose of curving the blades as specified is to assist in preventing the material from wrapping about the feed roller during its cooperation with the endless feed mechanism 6 in uniformly supplying the cutting or chopping mechanism.

The arms 8 permit the feed roller to move upwardly and downwardly in accordance with the bulk of material engaged thereby and which is being fed toward the cutting or chopping mechanism by the endless conveyor mechanism 6.

The length of the blades is substantially equal to the width of the endless feeding mechanism 6 so as to readily cooperate therewith in forcing the material carried by said conveyor mechanism into the cutting or chopping mechanism.

Substantially conical shaped sleeves 24 are mounted on the shaft 11 at the ends of the body 16 and receive the ends thereof and are suitably secured to said body, as shown at 25. The purpose of the conical shaped sleeves 24 is to prevent the material acted on by the blades from gathering and wrapping about the shaft 11. Thus it will be seen that due to the curvature of the blades and the conical shaped sleeves the feed roller will be substantially free of material wrapping thereon during the action of the blades on the material in cooperating with the feed mechanism 6 in delivering said material to the cutting or chopping mechanism.

While I have shown and described the preferred embodiment of my invention, it will be understood that minor changes in construction, combination and arrangements of parts may be made without departing from the spirit and scope of the invention as claimed.

Having thus described my invention, what I claim is:

In a feed roller for a cutting machine, an endless feed belt of a cutting machine, arms journaled on the machine for free upward and downward movement relative to the feed belt, a shaft journaled on said arms and arranged transversely of the endless feed belt, a cylindrical body mounted on said shaft, end plates secured to the ends of the body and including collars receiving the shaft and provided with set screws turned against said shaft, drive means connected to the shaft for rotating the body in one direction, radially extending blades secured to the periphery of the body and having free end portions thereof curved in a direction opposite to the direction of rotation of the body to assist in preventing material from wrapping about the blades and the body, and conical shaped sleeves mounted on the shaft and secured to the ends of the body and enclosing the set screws and collars and acting to prevent wrapping of the material about the shaft adjacent the ends of the body.

HERBERT STAHL.